United States Patent
Wyler

(10) Patent No.: US 6,670,601 B1
(45) Date of Patent: Dec. 30, 2003

(54) FIBEROPTIC FUEL GAUGING SYSTEM FOR MEASURING THE LEVEL OF A LIQUID IN A TANK

(75) Inventor: John S. Wyler, Berwyn, PA (US)

(73) Assignee: Smiths Aerospace, Inc., Malvern, PA (US)

( * ) Notice: Subject to any disclaimer, the term of this patent is extended or adjusted under 35 U.S.C. 154(b) by 0 days.

(21) Appl. No.: 09/936,830

(22) PCT Filed: Mar. 13, 2000

(86) PCT No.: PCT/US00/06536

§ 371 (c)(1),
(2), (4) Date: Dec. 10, 2001

(87) PCT Pub. No.: WO00/57154

PCT Pub. Date: Sep. 28, 2000

Related U.S. Application Data

(60) Provisional application No. 60/125,269, filed on Mar. 19, 1999.

(51) Int. Cl.[7] .................. G01N 15/06; G01F 23/00; G08B 21/00
(52) U.S. Cl. ............... 250/227.11; 250/577; 73/293; 340/620
(58) Field of Search .................. 250/577, 227.11, 250/904; 73/293; 340/619, 620; 356/136

(56) References Cited

U.S. PATENT DOCUMENTS

| | | | |
|---|---|---|---|
| 3,995,168 A | * 11/1976 | Neuscheler et al. | 250/577 |
| 4,090,408 A | 5/1978 | Hedrick | 73/304 C |
| 4,173,893 A | 11/1979 | Hedrick | 73/304 C |
| 4,420,976 A | 12/1983 | Orloff et al. | 73/304 |
| 4,451,894 A | 5/1984 | Dougherty et al. | 364/509 |
| 4,487,066 A | 12/1984 | Pardi et al. | 73/304 |
| 4,713,552 A | * 12/1987 | Denis et al. | 73/293 |
| 4,731,730 A | 3/1988 | Hedrick et al. | 364/509 |
| 4,872,120 A | 10/1989 | Orloff et al. | 364/509 |
| 4,880,971 A | * 11/1989 | Danisch | 250/577 |
| 4,906,845 A | * 3/1990 | Bellhouse et al. | 250/577 |
| 4,908,783 A | 3/1990 | Maier | 364/560 |
| 4,918,619 A | 4/1990 | Orloff et al. | 364/509 |
| 4,963,729 A | 10/1990 | Spillman et al. | 250/227.21 |
| 5,602,333 A | 2/1997 | Larrabee et al. | 73/149 |
| 5,627,380 A | * 5/1997 | Crowne | 250/577 |
| 6,278,381 B1 | 8/2001 | Bogert | 340/945 |

* cited by examiner

Primary Examiner—Stephone B. Allen
(74) Attorney, Agent, or Firm—Howson and Howson

(57) ABSTRACT

A safe and reliable aircraft fuel gauging system which eliminates the need for electrical wiring to transmit electrical signals into and out of the fuel tank of an aircraft. The fuel gauging system utilizes at least one light source to generate input light signals which are delivered to a plurality of probes multiplexed on a fiber optic element. The same, or a separate, fiber optic element transmits the probes' output light signals to a light detector located externally of the fuel tank. Each probe includes a photoelectric conversion device, an LC resonant circuit, and a magnetooptic device for generating the responsive output light signal to the input light signal. Based on the output signal form the probes, the light detector determines the level of fuel in the tank.

18 Claims, 4 Drawing Sheets

FIBEROPTIC FUEL GAUGING SYSTEM FOR MEASURING THE LEVEL OF A LIQUID IN A TANK

This application claims the benefit of provisional application No. 60/125,269, filed Mar. 19, 1999.

FIELD OF THE INVENTION

The present invention relates generally to a system for measuring the level of a liquid in a tank, and more particularly, the present invention relates to an aircraft fuel gauging system which is capable of safely and reliably transmitting signals into and out of an aircraft fuel tank to probes located therein.

BACKGROUND OF THE INVENTION

For safety and economic reasons, aircraft must have the capability of determining accurately the amount of fuel onboard. Thus, various fuel gauging systems and other sensing apparatus have been utilized to deliver information concerning the status of fuel carried by the aircraft to the pilot. In general, all these systems require portions of electronic circuits, such as, electrical wiring, probes, sensors, etc., to extend inside the fuel tank.

Examples of known aircraft fuel gauging systems are disclosed in U.S. Pat. No.: 5,602,333 issued to Larrabee et al.; U.S. Pat. No. 4,918,619 issued to Orloff et al.; U.S. Pat. No. 4,908,783 issued to Maier; U.S. Pat. No. 4,872,120 issued to Orloff et al.; U.S. Pat. No. 4,731,730 issued to Hedrick et al.; U.S. Pat. No. 4,451,894 issued to Dougherty et al.; U.S. Pat. No. 4,487,066 issued to Pardi et al.; U.S. Pat. No. 4,173,893 issued to Hedrick; and U.S. Pat. No. 4,090,408 issued to Hedrick.

As a result of a recent airplane accident, namely the "TWA 800" accident, the FAA and the aviation industry have focused a great deal of attention on the electrical systems in airplane fuel tanks. Such electrical systems, such as pumps and fuel gauging, have been found with damaged wiring insulation which invites the possibilities of electrical shorts in the fuel tank. Such conditions violate the original design intent of providing electrical circuit isolation in the fuel tank.

The FAA has responded to these concerns by issuing several Airworthiness Directives requiring the modification of airplanes to eliminate these potential hazards. Additional requirements are expected to be issued that will further restrict electrical power in aircraft fuel tanks. These new requirements impose additional costs on operators of aircraft, both for initial aircraft modifications and repair and for continued maintenance of these fuel tank electrical systems. Many of the solutions to these problems involve the addition of wire shielding which adds weight to the airplane; however, the additional weight results in increases in the cost to fly the airplane.

As referenced above, U.S. Pat. No. 5,602,333, which issued to Larrabee et al. and which is assigned to the assignee of the present application, discloses a scheme of multiplexing several fuel capacitance probes on a single set of wires. A schematic representation of the system is illustrated in FIG. 2. The probe capacitance and a fixed inductor form a resonant circuit having a resonant frequency which is a function of the probe capacitance which is in turn a function of the fuel height at the probe. While this system offers improvements over previous technology and limits the electrical wiring in the tank, it still relies on the use of electrical wiring to bring signals in and out of the fuel tank.

Therefore, although various fuel gauging systems are known in the art which may be satisfactory for their intended purposes, there is a need for a novel fuel gauging system which requires no electrical wires to enter, or exit, the fuel tank. In addition, the system should permit multiplexing of a large number of fuel probes and should weigh less then currently available systems.

OBJECTS OF THE INVENTION

With the foregoing in mind, a primary object of the present invention is to completely eliminate the use of electrical wires to transmit signals in and out of fuel tanks.

Another object of the present invention is to provide an accurate and lightweight aircraft fuel gauging system which includes the multiplexing of a relatively large number of fuel probes.

SUMMARY OF THE INVENTION

More specifically, the present invention provides an apparatus having at least one probe for measuring the level of a liquid in a tank. The probe is located in the tank for at least partial immersion in the liquid and is capable of receiving an input signal and providing an output signal in response to the input signal. The output signal is utilized to determine the level and amount of liquid in the tank.

The improvement provided by the apparatus of the present invention is the use of a fiber optic element for transmitting the input signal to the probe. The input signal is generated by a light source externally of the tank and is transmitted into the tank by the fiber optic element.

According to one embodiment of the present invention, the same fiber optic element transmits both the input signal from the light source and the output signal from the probe. The output signal is transmitted to a light detector located exteriorly of the tank.

According to an alternate embodiment of the present invention, a second separate fiber optic element is used to transmit a measurement light signal to the probe and to transmit the output signal from the probe to a light detector located exteriorly of the tank.

BRIEF DESCRIPTION OF THE DRAWINGS

The foregoing and other objects, features and advantages of the present invention should become apparent from the following description when taken in conjunction with the accompanying drawings, in which.

DETAILED DESCRIPTION OF THE PREFERRED EMBODIMENT

Figure 1:
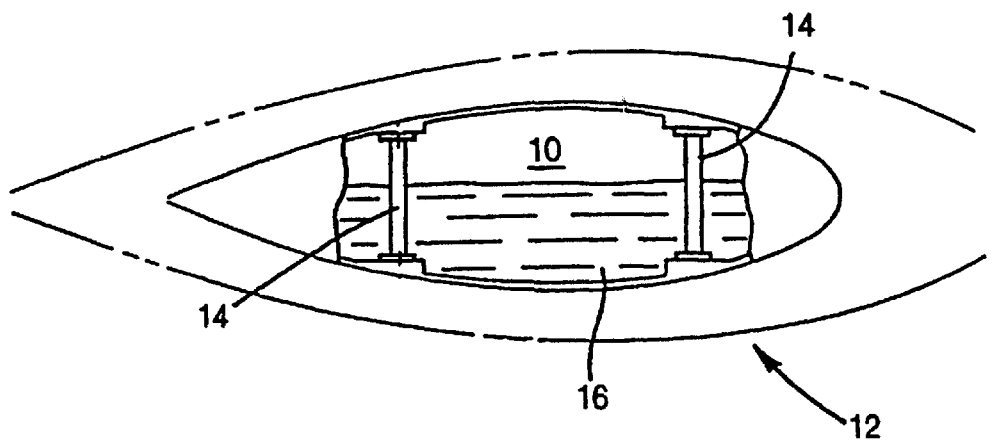
FIG. 1 is a schematic cross sectional view in reduced scale of a fuel tank located within the wing of an aircraft and having fuel level probes.

Referring now to the drawings, FIG. 1 illustrates schematically a portion of a fuel tank 10 located in the wing 12 of a typical aircraft. A series of probes 14, in the illustration two in number, extend transverse to the normal direction of fuel level movement, or vertically, within the fuel tank 10 in spaced fore and aft relation. A signal can be applied to the probes 14 for producing an output signal which is a function of the level of fuel 16 in the probes. The measured level of the fuel 16 enables the amount of fuel carried in the tank to be calculated and displayed to the pilot.

Figure 2:
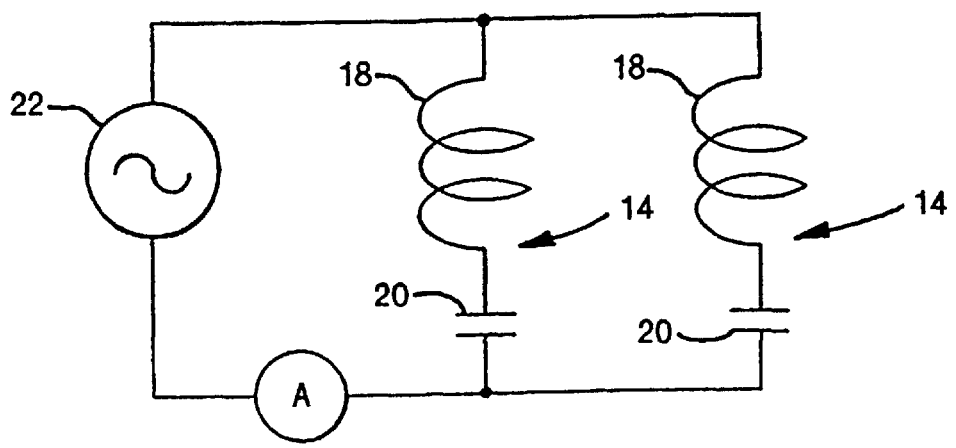
FIG. 2 is a simplified circuit diagram illustrating the theoretical underpinnings of the present assignee's prior art fuel gauging system.
Figure 3:
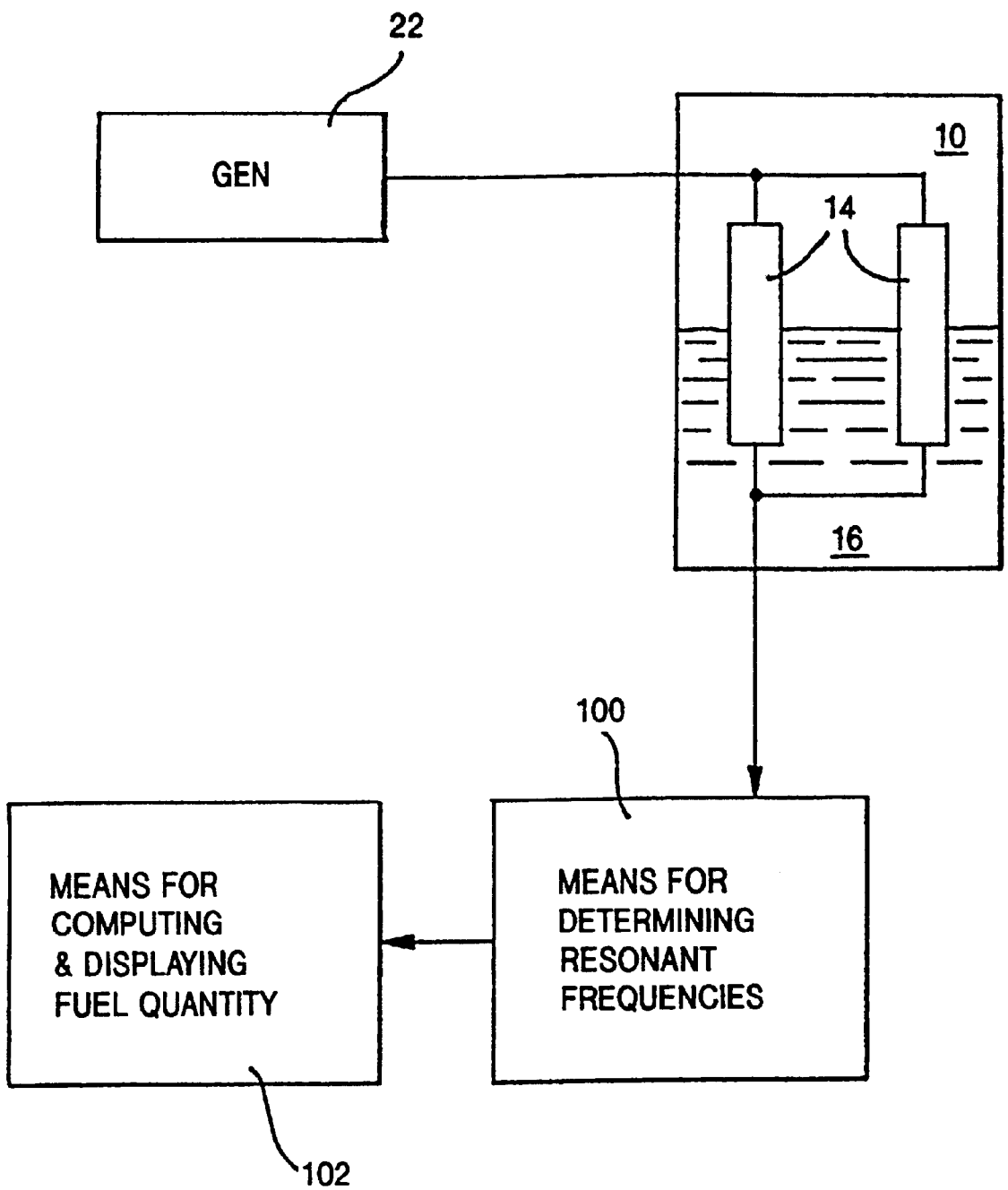
FIG. 3 is a simplified block diagram of the present assignee's prior art fuel gauging system.

The fuel gauging system of the present invention can be utilized with any fuel measuring probes, but is preferably utilized with the probes disclosed in the present assignee's '333 patent which was previously discussed. The disclosure of U.S. Pat. No. 5,602,333 is incorporated herein by reference. To this end, as illustrated in FIG. 2, each probe 14 has an inductor 18 connected in series with a capacitor 20 to form a series inductive-capacitance (LC) resonant circuit. Thus, as the fuel level changes, the probe capacitance changes, and this changes the resonant frequency of the probe. As illustrated in FIG. 3, a generator 22 applies an input signal to several multiplexed probes 14. A receiver 100 receives the response of the multiplexed probes 14 to the input signal and determines the resonant frequency of each probe. A means 102 is provided with sufficient information about the resonant frequency determination to compute and display the quantity of fuel 16 in the tank 10.

The fuel gauging system of the '333 patent utilized a single pair of wires to transmit input and output signals to and from the multiplexed probes. To this end, a first electrical wire extended from outside the fuel tank wall, through the fuel tank wall, and into the fuel tank so that it could be connected to each probe 14 in the fuel tank 10 to deliver the electrical input signal to each probe. A second electrical wire extended from inside the fuel tank wall, through the fuel tank wall, and out of the fuel tank wall to deliver the output signal from the probes 14 to the receiver 100 so that the level of the fuel could be calculated.

According to the present invention, a novel fuel gauging system is provided which completely eliminates the use of electrical wiring for transmitting input and response signals to and from probes located in a fuel tank. The present invention utilizes fiber optics to transmit light power and light signals to and from the probes. As will be discussed in greater detail, compact-sized solid state lasers are utilized to provide significant light sources and photoelectric devices are utilized to accurately convert light to electric power.

Figure 4:
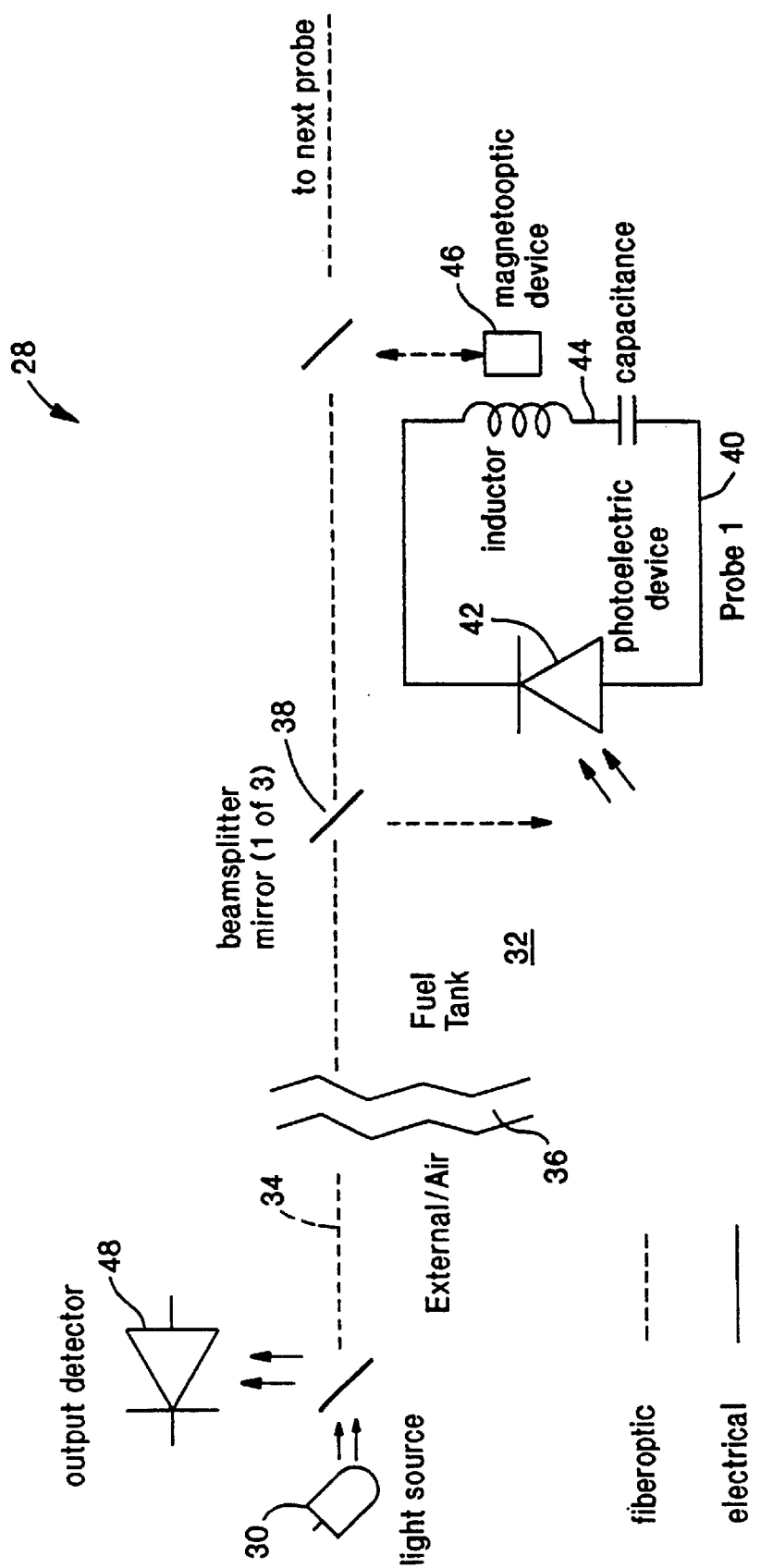
FIG. 4 is a schematic diagram of a fiberoptic fuel gauging system according to the present invention.

FIG. 4 illustrates one embodiment of a fuel gauging system 28 of the present invention. A laser 30 is located exteriorly of a fuel tank 32 and generates a light signal which is transmitted by a fiber optic element 34 through a tank wall 36 and into the tank 32. A beamsplitter 38 is utilized to direct some of the light to a first probe 40. Other beamsplitters (not shown) can be utilized to direct light to other probes (not shown) which are multiplexed on the same fiber optic element 34.

The probe 40 has a photoelectric conversion device 42, for instance, a photovoltaic cell, which receives the light directed by the beamsplitter 38. The photoelectric device 42 converts the light into an output voltage and applies the voltage across a capacitor/inductor resonant circuit 44 of the probe 40. The applied voltage causes the resonant circuit 44 to oscillate.

A magnetooptic device 46 is located within the inductor of the resonant circuit 44 and is exposed to the magnetic field which is within the inductor coil and which varies with time as the resonant circuit 44 resonates. The magnetooptic device 46 is specifically selected so that the transmission of light through it is a function of the magnetic field to which it is exposed. Such devices can be constructed of various materials that exhibit the Faraday effect. See the Handbook of Optics, W. G. Driscoll, ed., McGraw-Hill, New York, 1978, pp. 17–20 to 17–22. These devices rotate the plane of light polarization by an amount proportional to the applied magnetic field according to the following equation:

$$\theta = VHl$$

where $\theta$ = rotational angle;
$V$ = Verdot constant;
$H$ = magnetic field strength; and
$l$ = light path length.

By inserting appropriate light polarizers (not shown), the magnetooptic device 46 transmits light in an amount proportional to the magnetic field strength to which it is exposed. Thus, some of the light transmitted by the fiber optic element 34 is routed through the magnetooptic device 46, and then, an amount of the light proportional to the magnetic field strength is returned back into the fiber optic element 34. The light is returned on the fiber optic element 34 to the laser end of the fiber optic element 34 and is stripped off and sent to a light detector 48 for measurement and determination of the level of fuel in the fuel tank 32.

Thus, fiber optics is utilized to deliver an input signal consisting of a given amount of light intensity to the probes in the fuel tank and to transmit a response signal consisting of a given amount of light intensity from the probes in the tank to a measurement device outside of the tank. Thus, the fuel gauging system is both safe and reliable.

Figure 5:
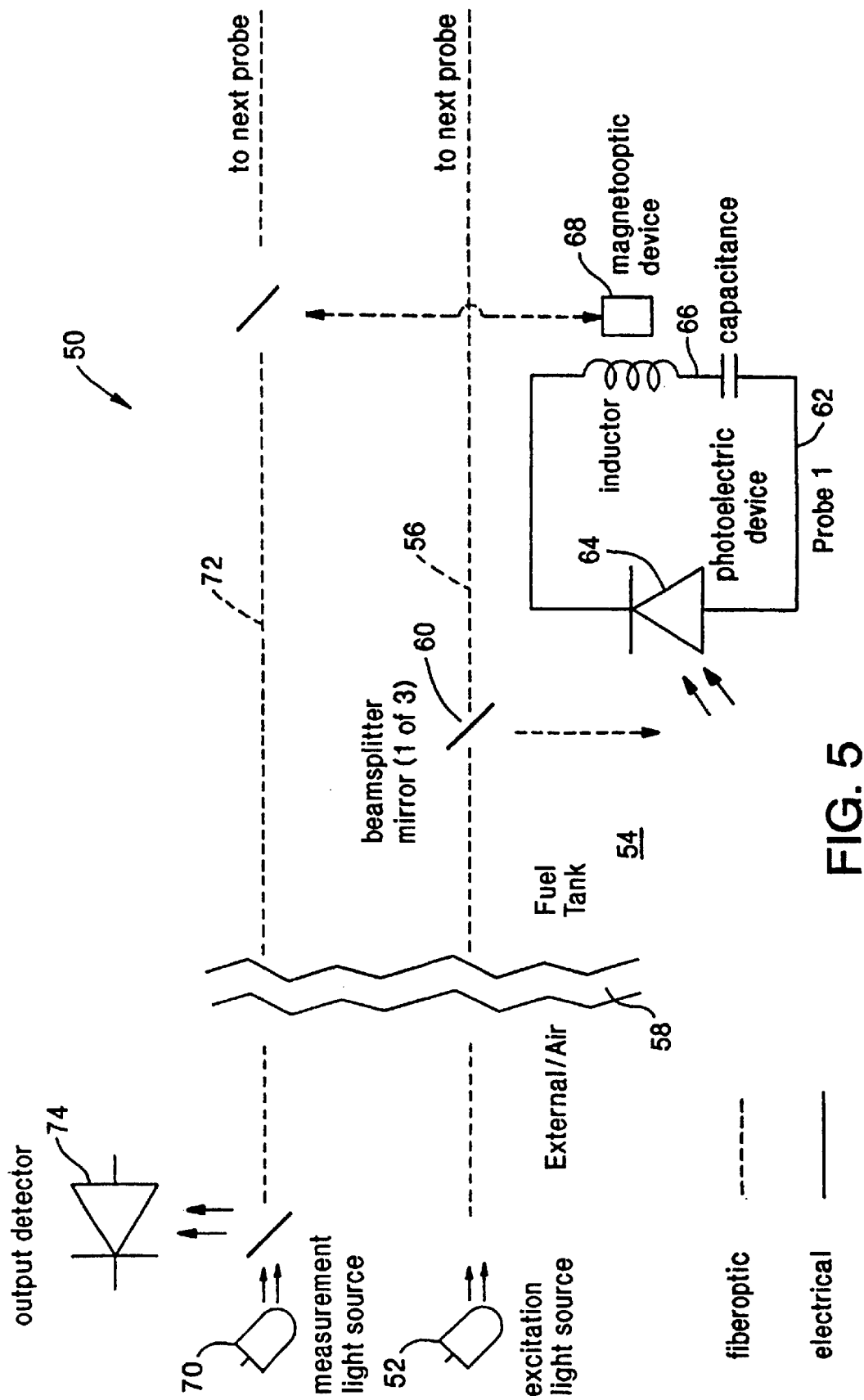
FIG. 5 is a schematic diagram of an alternate fiberoptic fuel gauging system according to the present invention.

FIG. 5 illustrates a second embodiment of a fuel gauging system 50 according to the present invention. An excitation light source 52 is located exteriorly of a fuel tank 54 and generates a light signal which is transmitted by a first fiber optic element 56 through a tank wall 58 and into the tank 54. A beamsplitter 60 is utilized to direct some of the light from the first fiber optic element 56 to a first probe 62. Other beamsplitters (not shown) can be utilized to direct light to other probes (not shown) which are multiplexed on the fiber optic element 56.

The probe 62 has a photoelectric conversion device 64 which receives the light directed by the beamsplitter 60 and converts the light into an output voltage which is applied across a capacitor/inductor resonant circuit 66 of the probe 62. The applied voltage causes the resonant circuit 66 to oscillate. A magnetooptic device 68 is located within the inductor of the resonant circuit 66 and is exposed to the magnetic field which is within the inductor coil and which varies with time as the resonant circuit 66 resonates.

A measurement light source 70, located externally of the fuel tank 54, generates a light signal which is transmitted into the fuel tank 54 by a second fiber optic element 72. The second fiber optic element 72 routes light through the magnetooptic device 68 of probe 62 as well as to other magnetooptic devices (not shown) on other probes (not shown) multiplexed on the second fiber optic element 72. The magnetooptic device 68 returns to the second fiber optic element 72 an amount of light which is proportional to the magnetic field strength to which the magnetooptic device 68 is exposed. The light is returned on the second fiber optic element 72 to the measurement light source end of the fiber optic element 72 and is stripped off and sent to a light detector 74 for measurement and determination of the level of fuel in the fuel tank 54.

In addition to eliminating electrical wiring carrying electric signals through a tank wall and into the tank, the fiber optic fuel gauging system of the present invention provides several other advantages. Fiber optic elements have a much greater signal bandwidth than wire so that a relatively large number of probes can be reliably multiplexed on the same element. Also, fiber optic elements weigh less than electrical wire; therefore, the use of fiber optics provide a weight savings. In addition, since the resonant circuit is limited to the probe itself, there is no parasitic effects due to wiring which would require calibration changes.

While preferred fuel gauging systems have been described in detail, various modifications, alterations, and changes may be made without departing from the spirit and scope of the present invention as defined in the appended claims.

What is claimed is:

1. In an apparatus having at least one probe (40, 62) for measuring the level of a liquid in a tank (32, 54), the probe (40, 62) being located in the tank (32, 54) for at least partial immersion in the liquid and being capable of receiving an input signal and providing an output signal in response thereto which can be utilized to determine the amount of liquid in the tank (32, 54), the improvement comprising a fiber optic element (34, 56) for transmitting the input signal to the probe (40, 62), the input signal being a light signal generated externally of the tank (32, 54) by a light source (30, 52) said probe (40, 62) having a photoelectric conversion device (42, 64) for converting the input light signal to an output voltage.

2. Apparatus according to claim 1, wherein said fiber optic element (34) receives an output light signal from said probe (40) and transmits the output light signal to a light detector (48) located exteriorly of the tank (32).

3. Apparatus according to claim 1, further comprising a second fiber optic element (72) for receiving an output light signal from the probe (62) and for transmitting the output light signal to a light detector (74) located exteriorly of the tank (54).

4. Apparatus according to claim 1, wherein the probe (40, 62) has a capacitor and inductor forming a resonant circuit (44, 66) which is applied with said output voltage of said photoelectric device (42, 64).

5. Apparatus according to claim 4, wherein the probe (40, 62) has a magnetooptic device (46, 68) which transmits the output light signal, the transmission of light by the magnetooptic device (46, 68) being a function of a magnetic field of said inductor of said resonant circuit (44, 66).

6. A fuel gauging system for measuring the amount of fuel in a fuel tank (32), comprising:

a probe (40) disposed in the tank (32) for at least partial immersion in the fuel, said probe (40) being capable of receiving an input light signal and providing an output light signal which can be utilized to determine the amount of fuel in the fuel tank (32), and said probe (40) having a photoelectric conversion device (42) for receiving light of said input light signal and for converting said light into an output voltage;

a light source (30) located externally of the tank (32) for generating said input light signal; and a fiber optic element (34) for transmitting said input light sigh from said light source (30) to said probe (40) and for transmitting said output light signal from said probe (40) to a light detector (48) located externally of the tank (32);

whereby, based on the amount of light detected by said light detector (48), the level, and thus, the quantity, of fuel in the tank (32) can be determined.

7. A fuel gauging system according to claim 6, wherein said photoelectric conversion device (42) is a photovoltaic cell.

8. A fuel gauging system according to claim 6, wherein said probe (40) has a resonant circuit (44) which has an inductor and a capacitor and which is applied with said output voltage of said photoelectric conversion device (42).

9. A fuel gauging system according to claim 8, wherein said probe (40) has a magnetooptic device (46) located such that said magnetooptic device (46) is exposed to a magnetic field of said inductor, said magnetooptic device (46) being capable of transmitting light, the transmission of light though the magnetooptic device (46) being a function of said magnetic field of said inductor of said resonant circuit (44).

10. A fuel gauging system according to claim 9, wherein said fiber optic element (34) directs light from said input light signal (30) into said magnetooptic device (46), and wherein said magnetooptic device (46) transmits at least a portion of said light back to said fiber optic element (34) which transmits said light as said output light signal to said light detector (48).

11. A fuel gauging system according to claim 10, further comprising a plurality of probes (40) multiplexed on said fiber optic element (34).

12. A fuel gauging system according to claim 11, further comprising a plurality of beamsplitters (38) which direct light from said fiber optic element (34) on to each probe (40).

13. A fuel gauging system according to claim 12, wherein said light source (30) is a solid state laser.

14. A fuel gauging system for measuring the amount of fuel in a fuel tank (54), comprising:

a probe (62) disposed in the tank (54) for at least partial immersion in the fuel, said probe (62) being capable of receiving an input light signal and providing an output light signal which can be utilized to determine the amount of fuel in the fuel tank (54);

an excitation light source (52) located externally of the tank (54) for generating an input light signal;

a first fiber optic element (56) for transmitting said input light signal from said excitation light source (52) to said probe (62);

a measurement light source (70) located externally of the tank (54) for generating an input light signal; and a second fiber optic element (72) for transmitting said input light signal from said measurement light source (70) to said probe (62) and for transmitting said output light signal from said probe (62) to a light detector (74) located externally of the tank (54).

15. A fuel gauging system according to claim 14, wherein said probe (62) has a photoelectric conversion device (64) for receiving light from said excitation light source (52) and for converting said light into an output voltage.

16. A fuel gauging system according to claim 15, wherein said probe (62) has a resonant circuit (66) which has an inductor and a capacitor and which is applied with said output voltage of said photoelectric conversion device (64).

17. A fuel gauging system according to claim 16, wherein said probe (62) has a magnetooptic device (68) located such that said magnetooptic device (68) is exposed to a magnetic field of said inductor, and wherein said magnetooptic device (68) is capable of transmitting light, the transmission of light though the magnetooptic device (68) being a function of said magnetic field of said inductor of said resonant circuit (66).

18. A fuel gauging system according to claim 17, wherein said second fiber optic element (72) directs light generated by said measurement light source (70) to said magnetooptic device (68), and wherein said magnetooptic device (68) transmits light back to said second fiber optic element (72) as said output light signal which transmits said output light signal from said magnetooptic device (68) to said light detector (74).

* * * * *